Z. L. HOOVER.
Post Hole Spade.

No. 201,787. Patented March 26, 1878.

UNITED STATES PATENT OFFICE.

ZENES L. HOOVER, OF MOLINE, ILLINOIS.

IMPROVEMENT IN POST-HOLE SPADES.

Specification forming part of Letters Patent No. 201,787, dated March 26, 1878; application filed November 6, 1877.

*To all whom it may concern:*

Be it known that I, ZENES L. HOOVER, of Moline, in the county of Rock Island and State of Illinois, have invented certain new and useful Improvements in Post-Hole Spades; and I do hereby declare that the following is a full, clear, and exact description thereof, which will enable others skilled in the art to which it appertains to make and use the same, reference being had to the accompanying drawings, which form a part of this specification, and in which—

Figure 1:
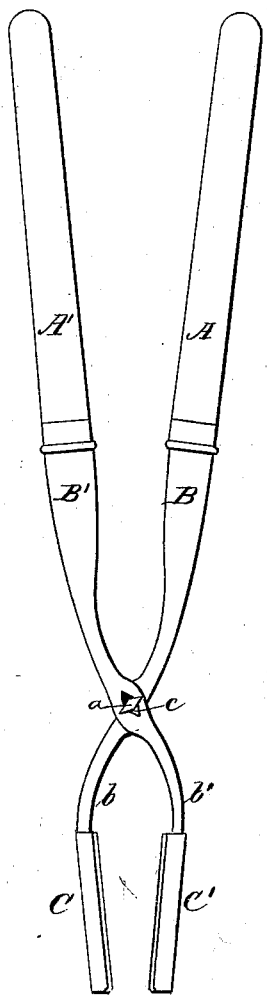
Figure 2:
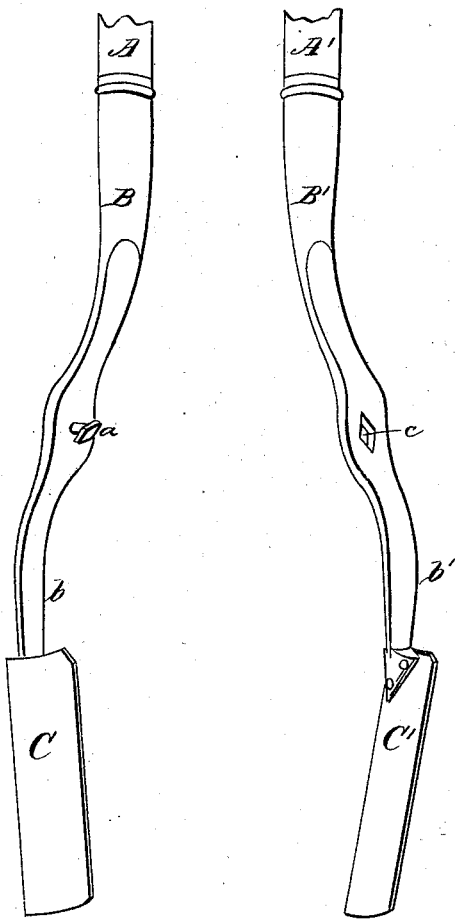

Figure 1 is a side elevation, and Fig. 2 is an enlarged perspective view of the lower hinged parts of the spades detached, which, when hinged together, form my improved post-hole digger and transplanter.

My invention relates to implements for digging post-holes and transplanting plants; and it consists in the construction and novel combination of the two parts which form the digger, so that these may be readily detached from or united to each other without the use of detachable screws or joints, which, in implements of this class, are apt to become detached and get lost, substantially as and for the purpose hereinafter more fully set forth, and pointed out in the claim.

In the drawing, A A' are the handles, which are preferably made of wood, and fitted into the metallic socket-pieces B B' of the spades C C'. The shanks $b\ b'$ of the latter are curved, and shank $b$ is provided with a lug, $a$, of the shape represented in Fig. 2, while shank $b'$ of spade C' has a correspondingly-shaped perforation, $c$. By inserting the head of lug $a$ through the perforation $c$, and then turning the parts, these will be firmly pivoted together like the blades of a pair of scissors; yet at the same time they may be readily detached from each other by turning shank $b'$ sufficiently to enable the diamond-shaped head or catch-piece of lug $a$ to slip out through the hole $c$.

By this construction and combination, the parts A B $b$ C and A' B' $b'$ C' may be detached from each other, and used as ordinary spades, or they may be hinged together in a moment, and used for the purpose of digging post-holes or transplanting. When used for the last-named purposes the manner of using this implement does not differ from that of other similar implements. The operator grasps a handle with each hand, and, holding the spades C C' parallel to each other, drives the blades into the ground, working the spades gradually around until the dirt is loosened on all sides, when the spades are clamped together (by pressing the handles against each other) and lifted out, clamping the loosened dirt between them, which is readily emptied out by separating the blades. This operation is repeated until a hole of the requisite depth has been obtained.

For transplanting, the spade-blades C C' are driven down on each side of the plant to be transplanted, and this, with the earth adhering around the roots, is carried to the place desired, and deposited in the hole made to receive it.

Having thus described my invention, I claim and desire to secure by Letters Patent of the United States—

As an improvement in detachable post-hole diggers and transplanters, the part A B $b$ C, having the lug $a$ permanently secured thereupon, in combination with the part A' B' $b'$ C', having perforation $c$ of a size and shape to fit over the head of lug $a$, substantially as and for the purpose herein shown and described.

In testimony that I claim the foregoing as my own I have hereto affixed my signature in presence of two witnesses.

ZENES L. HOOVER.

Witnesses:
CHAS. W. GLEASON,
I. S. JOHNSON.